(12) United States Patent
Gokmen et al.

(10) Patent No.: US 12,467,503 B2
(45) Date of Patent: Nov. 11, 2025

(54) POWER TRANSFER MECHANISM

(71) Applicant: TUSAS- TURK HAVACILIK VE UZAY SANAYII ANONIM SIRKETI, Kahramankazan/Ankara (TR)

(72) Inventors: Erkan Gokmen, Kahramankazan/Ankara (TR); Burhan Sahin, Kahramankazan/Ankara (TR)

(73) Assignee: TUSAS- TURK HAVACILIK VE UZAY SANAYII ANONIM SIRKETI, Kahramankazan/Ankara (TR)

( * ) Notice: Subject to any disclaimer, the term of this patent is extended or adjusted under 35 U.S.C. 154(b) by 99 days.

(21) Appl. No.: 18/535,249

(22) Filed: Dec. 11, 2023

(65) Prior Publication Data
US 2024/0209895 A1   Jun. 27, 2024

(30) Foreign Application Priority Data
Dec. 22, 2022   (TR) ................ 2022/020012

(51) Int. Cl.
   *F16C 33/66*   (2006.01)

(52) U.S. Cl.
   CPC ........ *F16C 33/6648* (2013.01); *F16C 33/667* (2013.01); *F16C 2326/43* (2013.01)

(58) Field of Classification Search
   CPC .......................... F16C 33/6648; F16C 33/6611
   See application file for complete search history.

(56) References Cited

U.S. PATENT DOCUMENTS

| | | | | |
|---|---|---|---|---|
| 1,086,663 A | * | 2/1914 | Field ................. | B60K 15/06 137/577 |
| 1,715,978 A | * | 6/1929 | Benit ................. | F16N 7/12 384/465 |
| 1,743,966 A | * | 1/1930 | Goudard ............. | F02M 1/00 137/590 |
| 2,056,434 A | * | 10/1936 | Muller ............... | F16N 13/04 184/33 |
| 2,628,871 A | * | 2/1953 | Powers .............. | F16C 33/6659 384/582 |
| 3,326,264 A | * | 6/1967 | Howard .............. | F01L 1/00 137/590 |
| 3,662,858 A | * | 5/1972 | Peterson ............ | F16N 7/12 184/103.1 |
| 4,286,829 A | * | 9/1981 | Heemskerk ........ | F16C 33/7886 384/469 |
| 4,403,679 A | * | 9/1983 | Snider ............... | F16H 1/14 173/218 |
| 5,102,240 A | * | 4/1992 | Oehy ................. | D01H 7/042 384/465 |

(Continued)

FOREIGN PATENT DOCUMENTS

GB   1340990 A   *   8/1973
GB   1357175 A   *   6/1974   .......... F16C 33/6648

*Primary Examiner* — Michael A Riegelman
(74) *Attorney, Agent, or Firm* — Notaro, Michalos & Zaccaria P.C.

(57) ABSTRACT

A power transfer mechanism includes a body (2) on a vehicle; an engine (E) in the body (2) which enables the vehicle to move; a shaft (3) on the body (2) which is activated by the engine (E); a housing (4) containing the shaft (3); and at least one bearing group (5) between the housing (4) wall and the shaft (3) which supports movement of the shaft (3).

8 Claims, 2 Drawing Sheets

(56) References Cited

U.S. PATENT DOCUMENTS

| | | | | |
|---|---|---|---|---|
| 8,020,665 B2* | 9/2011 | Sheridan | .................. | F02C 7/36 |
| | | | | 184/6.12 |
| 8,272,480 B2* | 9/2012 | Jensen | .................. | B01D 35/16 |
| | | | | 184/6.24 |
| 8,292,036 B2* | 10/2012 | Nishida | .............. | F16H 57/0402 |
| | | | | 184/6.24 |
| 8,511,435 B2* | 8/2013 | Sheridan | ............. | F01M 11/067 |
| | | | | 184/6.12 |
| 8,517,148 B2* | 8/2013 | Portlock | ................ | F01D 25/18 |
| | | | | 184/6.12 |
| 8,651,239 B2* | 2/2014 | Aida | .................. | F16H 57/0408 |
| | | | | 184/6.12 |
| 10,145,464 B2* | 12/2018 | Poster | .................... | B64C 27/12 |
| 10,711,877 B2* | 7/2020 | Fisher | .................... | F16H 57/0486 |
| 2008/0116010 A1* | 5/2008 | Portlock | ................ | F01D 25/18 |
| | | | | 184/6.12 |
| 2011/0048856 A1* | 3/2011 | Thivierge | ............... | F01D 25/20 |
| | | | | 184/6.21 |
| 2012/0227820 A1* | 9/2012 | Poster | .................... | F01M 5/001 |
| | | | | 184/6 |
| 2012/0247874 A1* | 10/2012 | Poster | ................ | F16H 57/0471 |
| | | | | 184/6.12 |
| 2014/0076661 A1* | 3/2014 | Xu | ...................... | F16H 57/0486 |
| | | | | 184/14 |
| 2014/0363113 A1* | 12/2014 | Katsaros | ............ | F16C 33/6648 |
| | | | | 384/469 |
| 2015/0030274 A1* | 1/2015 | Adane | .................... | F16C 33/60 |
| | | | | 384/469 |
| 2016/0356314 A1* | 12/2016 | Hasama | ................... | F16N 9/02 |
| 2017/0241539 A1* | 8/2017 | Poster | ................ | F16H 57/0471 |
| 2024/0209895 A1* | 6/2024 | Gokmen | ............. | F16C 33/667 |

* cited by examiner

POWER TRANSFER MECHANISM

CROSS-REFERENCE TO RELATED APPLICATIONS

This patent application claims the benefit and priority of Turkish Patent Application No. 2022/020012, filed on Dec. 22, 2022, the disclosure of which is incorporated by reference herein in its entirety as part of the present disclosure.

FIELD

This invention relates to a mechanism provided on a vehicle for providing power transfer.

BACKGROUND

Power transfer in vehicles is provided by transferring the power received from the engines to the movement elements. Rotary wing air vehicles have power transfer mechanisms that transfer power from engine to blades to move these vehicles. A power transfer mechanism comprises gears and bearings. Helicopter gearboxes have a lubrication and cooling system. A fluid that lubricates the gears and bearings also performs the cooling function. In case of a malfunction that causes oil leakage, cooling and lubrication fluid may not be delivered to the system. In such a situation, gears and bearings heat up in a relatively short period due to excessive friction. Overheating damages gears and bearings. As a result, gears and bearings fail to transfer power. Therefore, helicopter cannot maintain its safe flight. In such emergency situations, the helicopter is required to fly for a certain period of time until landing. Lubrication mechanisms placed in the power transfer mechanism with the capability of operating in case of malfunction can enable the power transfer mechanisms to make helicopter fly for a while longer.

The invention discussed in U.S. Pat. No. 10,145,464B2, which is included in the known-state of the art, discloses a housing that retains lubricating fluid, a supply line in fluid communication with the reserve housing, a mechanism configured to supply pressurized lubricating fluid to the reserve housing. An overflow tube has an overflow port, the overflow tube being configured to prevent the volume of the lubrication fluid from exceeding a certain amount. A metering jet is configured to allow the lubrication fluid to flow from the reserve housing onto a component, such as a bearing, in the gearbox at a predetermined rate. The metering jet provides flow of the lubrication fluid onto the bearing even when the supply line no longer provides pressurized lubrication fluid to the reserve housing.

The invention discussed in U.S. Pat. No. 10,711,877B2, which is included in the known-state of the art, discloses a gearbox assembly for a gas turbine engine, a gearbox housing, a gear train assembly housed within the gearbox housing, a lubricant in the gearbox housing for lubricating the gear train assembly. The first scavenge port remains in an open position during normal operation of the gas turbine engine to allow the lubricant to drain from the gearbox housing. Upon occurrence of a loss of lubricant pressure in the gearbox assembly, the first scavenge port is changed to a closed position to trap at least a portion of the lubricant in the gearbox housing. Thus, the trapped lubricant provides passive lubrication to the gear train assembly during the loss of lubricant pressure.

SUMMARY

Thanks to a power transfer mechanism according to the present invention, an additional mechanism is provided to provide the necessary lubrication in case of malfunctions in lubrication mechanisms of the power transfer elements in air, land and sea vehicles.

Another object of the present invention is to provide lubrication and cooling of the power transfer mechanism with a lighter mechanism in helicopters, in case of malfunction.

A further object of the present invention is to enable the helicopter power transfer mechanism to operate for a longer period of time in case of cooling system failures.

The power transfer mechanism realized to achieve the object of the invention, which is defined in the first claim and other claims dependent thereon, comprises a body on an air, land or sea vehicle. It comprises an engine located in the body for actuating the vehicle; a shaft on the body, which is activated by the engine; and a housing containing the shaft. At least one bearing group is provided between a wall of the housing and the shaft, which serves as a support for the movement of the shaft.

The power transfer mechanism according to the invention comprises a sponge in the housing, which absorbs and retains an oil-like fluid; a trigger that compresses and triggers the sponge, thus allowing the oil-like fluid retained in the internal structure of the sponge to flow towards the bearing group by the effect of gravity, and allowing the bearing group to be cooled by the oil-like fluid.

In an embodiment of the invention, the power transfer mechanism comprises the bearing group placed opposite the sponge so that the oil or a similar fluid stored in the sponge's internal structure and flowing down by gravity flows into the bearing group.

In an embodiment of the invention, the power transfer mechanism comprises a shaft wall located inside the housing and surrounding the shaft; a housing wall containing the bearing group and located in the casing, in connection with the shaft wall. The sponge is located between the inner housing and the housing wall, and remains in full contact with the shaft wall and housing wall upon compression of the trigger.

In an embodiment of the invention, the power transfer mechanism comprises at least one lubricating element on the housing that lubricates the shaft and/or bearing group; the sponge which is filled with oil-like fluid through pores therein and pumped by the lubricating element predetermined by the user.

In an embodiment of the invention, the power transfer mechanism comprises at least one bearing providing support within the bearing group; at least one outer ring that surrounds and holds the bearing; the trigger in contact with the outer ring, wherein if a temperature of the heated bearing reaches a threshold temperature value predetermined by the manufacturer when the lubricating element is not operating, volume of the trigger is increased, thereby pressing and compressing the sponge.

In an embodiment of the invention, the power transfer mechanism comprises the sponge made of porous silica or carbon aerogel that lubricates and cools the bearing by flowing the oil-like fluid towards the bearing when compressed.

In an embodiment of the invention, the power transfer mechanism comprises the sponge substantially in a donut shape, which is form-compatible with the housing wall and provided to surround the shaft wall, or provided at a distance thereto.

In an embodiment of the invention, the power transfer mechanism comprises at least one bottom cover located on the housing wall with a movable structure for compressing the sponge by the trigger having an increased volume, wherein the bottom cover has a hollow structure to transmit the oil-like fluid stored in the pores of the sponge to the bearing group.

In an embodiment of the invention, the power transfer mechanism comprises a stopper that ensures stability of the sponge, and has a perforated structure to allow the oil-like fluid flowing from the lubricating element to the bearing group by gravity to reach the sponge.

BRIEF DESCRIPTION OF THE DRAWINGS

The power transfer mechanism realized to achieve the object of the present invention is illustrated in the attached drawings, in which.

Figure 1:
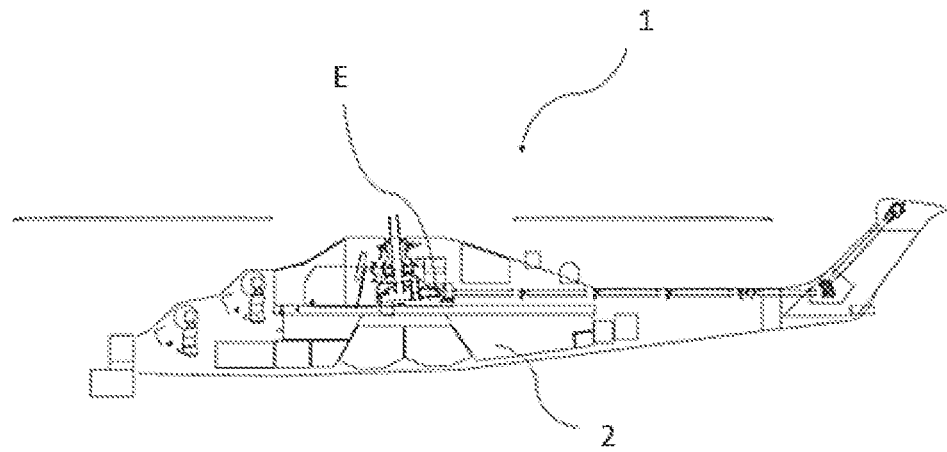
FIG. 1 is a schematic view of the body.

All the parts illustrated in figures are individually assigned a reference numeral and the corresponding terms of these numbers are listed below:
1. Power transfer mechanism
2. Body
3. Shaft
4. Housing
    401. Shaft wall
    402. Housing wall
5. Bearing group
6. Sponge
7. Trigger
8. Lubricating element
9. Bottom cover
10. Stopper
(E) Engine

DETAILED DESCRIPTION

The power transfer mechanism (1) comprises a body (2) on a vehicle; an engine (E) in the body (2), which enables the vehicle to move; a shaft (3) on the body (2), which is activated by the engine (E); a housing (4) containing the shaft (3); at least one bearing group (5) between the housing (4) wall and the shaft (3), which supports movement of the shaft (3).

The power transfer mechanism (1) according to the invention comprises a sponge (6) located inside the housing (4) with the capability of absorbing and storing a fluid; a trigger (7) that triggers and compresses the sponge (6), thus allowing the fluid stored in the sponge (6) to reach the bearing group (5) by the effect of gravity, thereby allowing the bearing group (5) to be cooled and lubricated.

An engine (E) is provided on the body (2) of air, land or sea vehicles that moves the vehicle. The engine (E) triggers the shaft (3) located on the body (2) and enables the vehicle to move. The shaft (3) is located in the housing (4) inside the body (2). Movement of the shaft (3) is supported by the bearing group (5) located between the housing (4) wall and the shaft (3) (FIG. 1).

Figure 2:
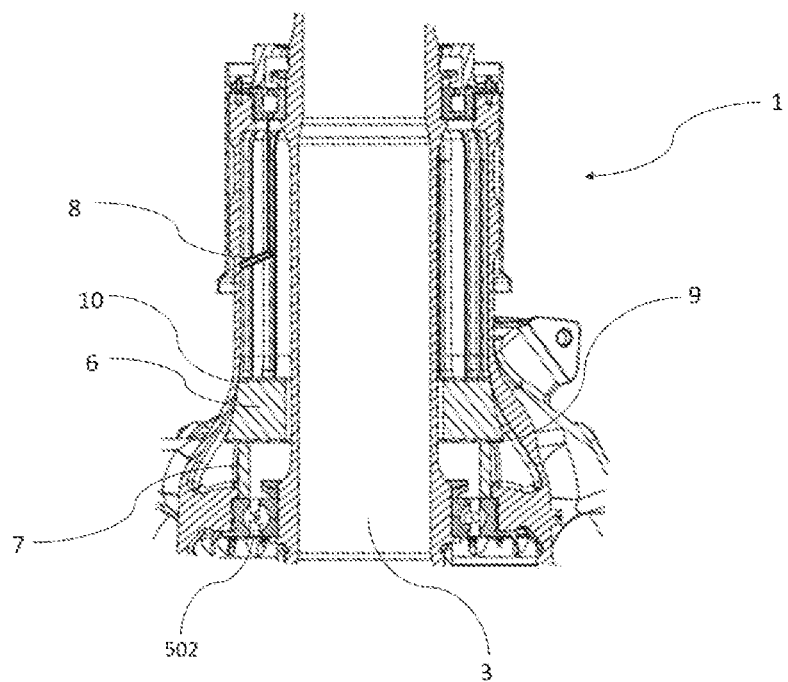
FIG. 2 is a cross-sectional view of the power transfer mechanism.
Figure 4:
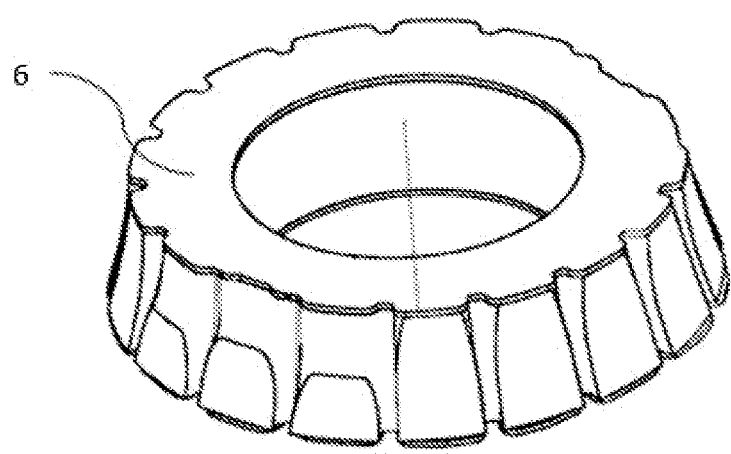
FIG. 4 is a perspective view of the sponge.

A sponge (6) is provided in the housing (4), which absorbs and stores any cooling liquid, e.g. oil, into its internal structure, thanks to its porous structure. A trigger (7) located on the body (2) triggers and compresses the sponge (6). Therefore, by squeezing the sponge (6), the oil or similar cooling liquid previously stored in the pores thereof is moved to the bearing group (5), so that the heated bearing group (5) is cooled effectively and quickly (FIG. 2, FIG. 4).

In an embodiment of the invention, the power transfer mechanism (1) comprises the bearing group (5) located opposite the sponge (6) so that the fluid falling from the sponge (6) by the effect of gravity is transferred to the bearing group (5). The bearing group (5) is located in the housing (4) below the sponge (6), almost opposite the sponge (6). Therefore, the oil and similar cooling liquid flowing down from the sponge (6) by gravity reaches the bearing group (5) to cool the heated bearing group (5).

Figure 3:
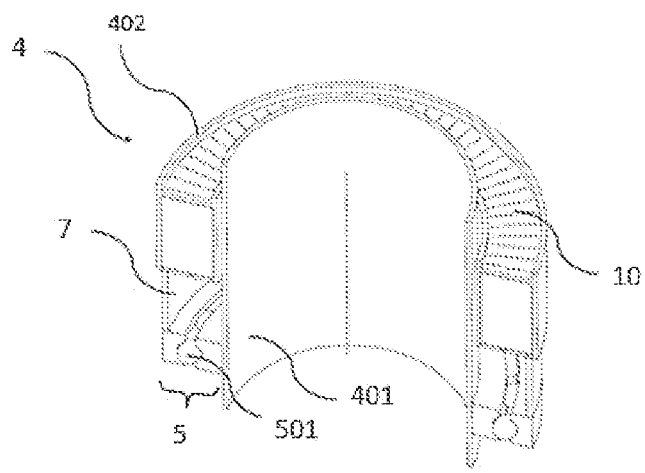
FIG. 3 is a sectional view of the housing.

In an embodiment of the invention, the power transfer mechanism (1) comprises a shaft wall (401) located in the housing (4) and surrounding the shaft (3); a housing wall (402) containing the bearing group (5) and located on the housing (4) in connection with the shaft wall (401); the sponge (6) which is located between the shaft wall (401) and the housing wall (402), in an area between the shaft wall (401) and the housing wall (402), so as to contact the shaft wall (401) and housing wall (402) when compressed. The housing (4) consists of a shaft wall (401) and a housing wall (402). The inner housing (401) surrounds the shaft (3). The bearing group (5) is located in the housing wall (402). The sponge (6) is located between the shaft wall (401) and the housing wall (402). As the sponge (6) is compressed by the trigger (7), it contacts the shaft wall (401) and the housing wall (402). In this way, the bearing group (5) can be easily lubricated (FIG. 3).

In an embodiment of the invention, the power transfer mechanism (1) comprises at least one lubricating element (8) located on the housing (4) for the lubrication of the shaft (3) and/or bearing group (5); the sponge (6) with pores that are filled with the fluid previously sent by the user from the lubricating element (8). The lubricating element (8) pumps oil-like cooling liquid to lubricate the shaft (3) and/or bearing group (5). The lubricating element (8) also transmits oil-like cooling liquid to the sponge (6). Thus, the liquid flowing from the lubricating element (8) by gravity is filled and stored into the pores within the sponge (6).

In an embodiment of the invention, the power transfer mechanism (1) comprises at least one bearing (501) located in the bearing group (5) and providing support; at least one outer ring (502) surrounding the bearing (501); the trigger (7) which contacts the outer ring (502); wherein if a temperature of the bearing (501) reaches a threshold value predetermined by the manufacturer in case the lubricating element (8) fails to operate, volume of the trigger (7) is increased, thereby pressing and compressing the sponge (6). A bearing (501) is provided in the bearing group (5) for supporting the shaft (3), and an outer ring (502) is provided around the bearing (501), and when the bearing (501) heats up, the outer ring (502) also heats up. The trigger (7) is in contact with the outer ring (502). In this way, heat transfer can be realized between the outer ring (502) and the trigger (7). When a temperature of the bearing (501) exceeds the threshold temperature value predetermined by the manufacturer, volume of the trigger (7) increases. Therefore, if the lubricating element (8) fails to operate during a flight of the vehicle, volume of the trigger (7) expands and compresses the sponge (6) as a result of the heated bearing (501) and outer ring (502), so that the liquid contained in the sponge (6) is conveyed to the bearing group (5) to cool the bearing (501) and outer ring (502).

In an embodiment of the invention, the power transfer mechanism (1) comprises the porous sponge (6) made of aerogel, which is capable of retaining fluid, thus transmitting the fluid therein to the bearing (501) when compressed, and allowing the bearing (501) to be lubricated and cooled. The sponge (6) is made of porous silica or carbon aerogel. Therefore, the sponge (6) can withstand high temperatures, and the bearing group (5) is cooled by the sponge (6) transmitting the liquid stored in its pores to the bearing (501).

In an embodiment of the invention, the power transfer mechanism (1) comprises the sponge (6) in an almost annular form, which at least partially surrounds the shaft wall (401) and is located in a form-compatible manner in the housing wall (402). The sponge (6) is located in the housing wall (402) in a donut shape so as to surround the shaft wall (401). Therefore, more effective cooling is provided for the bearing group (5).

In an embodiment of the invention, the power transfer mechanism (1) comprises at least one bottom cover (9), which has a perforated form in order for the fluid stored in the sponge (6) to reach the transmission group (5), wherein the bottom cover (9) is movable relative to the outer housing, so that when volume of the trigger (7) increases, it presses and compresses the sponge (6). A movable bottom cover (9) is located almost below the sponge (6). When the trigger (7) expands in volume, it applies pressure to the bottom cover (9), allowing the sponge (6) to be compressed. The bottom cover (9) has a perforated structure in order to allow the liquid in the pores of the sponge (6) to fall down. In this way, the bearing group (5) is lubricated and cooled effectively.

In an embodiment of the invention, the power transfer mechanism (1) comprises a stopper (10) with a perforated structure, which is fixed to limit a movement of the sponge (6), and enables the fluid flowing from the lubricating element (8) towards the bearing group (5) by the effect of gravity, to reach the sponge (6). In order to compress the sponge (6), there is a fixed stopper (10) on the top of the sponge (6), in a direction of the force applied by the trigger (7). Therefore, the sponge (6) is compressed, so that the liquid stored therein is transferred to the bearing group (5). The stopper (10) has a perforated structure in order for the liquid obtained from the lubricating element (8) to reach the sponge (6). In this way, the oil-like cooling liquid is enabled to reach the sponge (6) effectively.

What is claimed is:

1. A power transfer mechanism (1) comprising:
   a body (2) on a vehicle;
   an engine (E) in the body (2) which enables the vehicle to move;
   a shaft (3) on the body (2) which is activated by the engine (E);
   a housing (4) containing the shaft (3);
   at least one bearing group (5) between the housing (4) wall and the shaft (3) which supports movement of the shaft (3);
   a sponge (6) located inside the housing (4) for absorbing and storing a fluid;
   a trigger (7) that triggers and compresses the sponge (6) so that the fluid stored in the sponge (6) reaches the bearing group (5) by the effect of gravity and thereby allowing the bearing group (5) to be cooled and lubricated; and
   a shaft wall (401) located in the housing (4) and surrounding the shaft (3) and a housing wall (402) containing the bearing group (5) and located on the housing (4) in connection with the shaft wall (401); wherein the sponge (6) is located between the shaft wall (401) and the housing wall (402), in an area between the shaft wall (401) and the housing wall (402), so as to contact the shaft wall (401) and housing wall (402) when compressed.

2. The power transfer mechanism (1) according to claim 1, wherein the bearing group (5) located opposite the sponge (6) so that the fluid moving from the sponge (6) by the effect of gravity is transferred to the bearing group (5).

3. The power transfer mechanism (1) according to claim 1, comprising at least one lubricating element (8) located on the housing (4) for the lubrication of the shaft (3) and/or bearing group (5); wherein the sponge (6) retains the fluid previously sent by a user from the lubricating element (8).

4. The power transfer mechanism (1) according to claim 1, wherein the sponge (6) has an almost annular form which at least partially surrounds the inner housing (401) and is located in a form-compatible manner in the housing wall (402).

5. The power transfer mechanism (1) according to claim 1, comprising at least one bottom cover (9) which has a perforated form in order for the fluid stored in the sponge (6) to reach the transmission group (5), wherein the bottom cover (9) is movable relative to the outer housing so that, as a volume of the trigger (7) increases, the bottom cover (9) presses and compresses the sponge (6).

6. A power transfer mechanism (1), comprising:
   a body (2) on a vehicle;
   an engine (E) in the body (2) which enables the vehicle to move;
   a shaft (3) on the body (2) which is activated by the engine (E);
   a housing (4) containing the shaft (3);
   at least one bearing group (5) between the housing (4) wall and the shaft (3) which supports movement of the shaft (3);
   a sponge (6) located inside the housing (4) for absorbing and storing a fluid;
   a trigger (7) that triggers and compresses the sponge (6) so that the fluid stored in the sponge (6) reaches the bearing group (5) by the effect of gravity and thereby allowing the bearing group (5) to be cooled and lubricated; and
   at least one bearing (501) located in the bearing group (5) and providing support and at least one outer ring (502) surrounding the bearing (501); wherein the trigger (7) contacts the outer ring (502); wherein if a temperature of the bearing (501) reaches a threshold value predetermined by the manufacturer in case the lubricating element (8) fails to operate, volume of the trigger (7) is increased, thereby pressing and compressing the sponge (6).

7. The power transfer mechanism (1) according to claim 6, wherein the porous sponge (6) is made of aerogel which is capable of retaining fluid, thus transmitting the fluid therein to the bearing (501) when compressed, and allowing the bearing (501) to be lubricated and cooled.

8. A power transfer mechanism (1), comprising:
   a body (2) on a vehicle;
   an engine (E) in the body (2) which enables the vehicle to move;
   a shaft (3) on the body (2) which is activated by the engine (E);
   a housing (4) containing the shaft (3);
   at least one bearing group (5) between the housing (4) wall and the shaft (3) which supports movement of the shaft (3);
   a sponge (6) located inside the housing (4) for absorbing and storing a fluid;

a trigger (7) that triggers and compresses the sponge (6) so that the fluid stored in the sponge (6) reaches the bearing group (5) by the effect of gravity and thereby allowing the bearing group (5) to be cooled and lubricated;

at least one lubricating element (8) located on the housing (4) for the lubrication of the shaft (3) and/or bearing group (5); wherein the sponge (6) retains the fluid previously sent by a user from the lubricating element (8); and a stopper (10) with a perforated structure which is fixed to limit a movement of the sponge (6) and enables the fluid transferred from the lubricating element (8) towards the bearing group (5) by the effect of gravity to reach the sponge (6).

* * * * *